Jan. 9, 1951     H. C. BOETTCHER     2,537,003
MEAT-SEPARATING GRID FOR MEAT TENDERING APPLIANCES
Filed Sept. 12, 1949

INVENTOR.
Harold C. Boettcher
BY
Stevens & Batchelor
Attorneys.

Patented Jan. 9, 1951

2,537,003

UNITED STATES PATENT OFFICE 2,537,003

MEAT-SEPARATING GRID FOR MEAT TENDERING APPLIANCES

Harold C. Boettcher, Chicago, Ill.

Application September 12, 1949, Serial No. 115,184

4 Claims. (Cl. 17—25)

My invention relates to the structure patented by William J. F. Boettcher on March 15, 1949, under No. 2,464,634, and deals more particularly with the means for attaching the meat-separating grid to the knife holder of the meat tendering appliance described in the patent.

One object of the present improvement is to provide attaching means for the said grid which are easily operated in order to make the mounting or detaching of the grid a quick operation.

Another object is to provide attaching means which suspend the grid from the knife holder without the need of additional securing means.

An important object is to provide attaching means for the purpose outlined which are of exceeding simplicity.

With the above objects in view, and any others which may suggest themselves from the description to follow, a better understanding of the invention may be had by reference to the accompanying drawing, in which.

Figure 1:
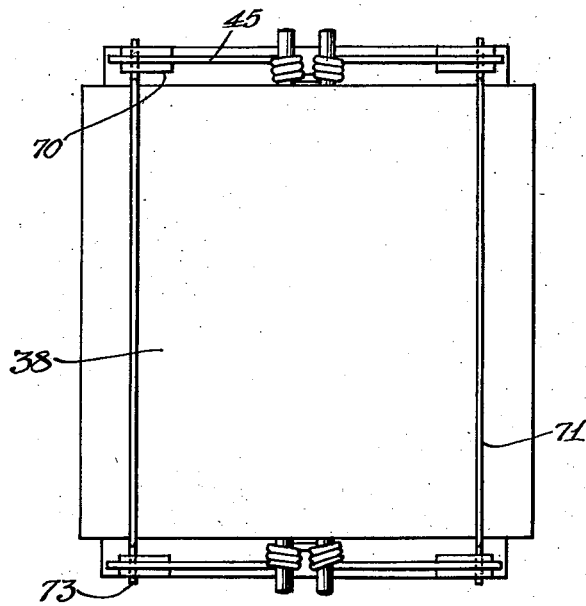
Fig. 1 is a top plan view of the assembly of the knife holder and meat-separating grid, showing the attaching means applied.

In accordance with the foregoing, it is noted that the knife holder 38 shown in the patent is employed in the present instance, the knives 39 projecting downwardly therefrom. The meat-separating grid 42 is similar to the one in the patent; and it is noted that the grid is pressed downwardly by the terminal springs 45 duplicating those in the patent, the ends of the springs seating in upward lugs 70 formed at the corners of the grid 42. To this extent the improved structure is similar to the one in the patent.

The lugs 70 of the grid are employed for the application of the novel attaching means for the grid. Such attaching means comprise a pair of wire arches 71, each arch relating to a pair of the lugs 70. Each arch overlies the holder 38; and the legs 72 of the arch are made with out-turned bends 73 at the bottom, such bends passing outwardly through horizontal bores 74 made in the related lugs 70.

Figures 2, 4:
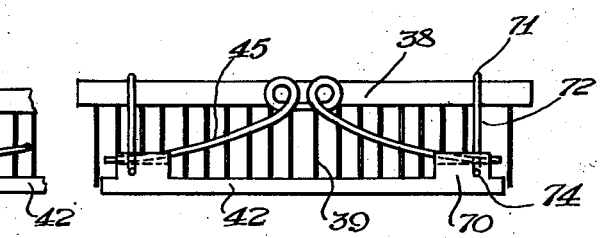
Fig. 2 is a front elevation of the assembly in Fig. 1.
Fig. 4 is a fragmentary view of the left-hand portion of Fig. 2, showing a change of position.
Figure 3:
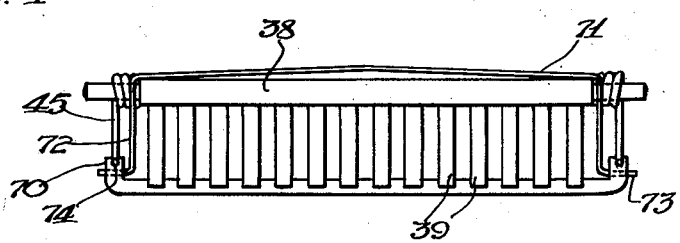
Fig. 3 is a side elevation.

Figs. 1 to 3 show the arches 71 applied in a manner to suspend the grid 42 from the holder 38; and it is obvious that the arches will rise without incident in case the grid moves toward the holder or vice versa. However, when the grid is to be removed, it is an easy matter to swing the arches outwardly in the manner indicated with respect to the left-hand arch in Fig. 4, so that the arches will clear the holder and permit the grid 42 to be separated and removed from the holder for cleaning or other attention.

It will now be apparent that the attaching means for the grid involve only the two simple and identical arches 71, these cooperating with the lugs 70 which already form part of the grid. The arches are a simple and inexpensive departure from the bolts or other means previously employed to support the grid; and they are handled more quickly than other types of attaching means when it is desired to separate or mount the grid in respect to the knife holder. An attaching means is thus provided which is an efficient improvement from all points of view.

While I have described the invention along specific lines, various minor changes or refinements may be made therein without departing from its principle, and I reserve the right to employ all such changes and refinements as may come within the scope and spirit of the appended claims.

I claim:

1. In a meat tendering machine, the combination with a horizontally positioned substantially rectangular plate having a plurality of pendent knives, and a meat-separating grid below the plate formed with pairs of marginal lugs below opposite sides of the plate; of means attached to said lugs and surmounting the plate to limit the separation of the grid from the same.

2. In a meat tendering machine, the combination with a horizontally positioned substantially rectangular plate having a plurality of pendent knives, and a meat-separating grid below the plate formed with pairs of marginal lugs below opposite sides of the plate; of arch-shaped means attached to said lugs and surmounting the plate to limit the separation of the grid from the same.

3. In a meat tendering machine, the combination with a horizontally positioned substantially rectangular plate having a plurality of pendent knives, and a meat-separating grid below the plate formed with pairs of marginal lugs below opposite sides of the plate; of arch-shaped elements pivoted at their bases in said lugs and straddling the plate to limit the separation of the grid from the same, said elements being located near the remaining sides of the plate and swingable outwardly to clear the plate and allow the grid to be removed from the same.

4. In a meat tendering machine, the combination with a horizontally positioned substantially rectangular plate having a plurality of pendent knives, and a meat-separating grid below the plate formed with pairs of marginal lugs below opposite sides of the plate; of wire arches having base extensions pivoted in said lugs, the crowns of the arches straddling the plate to limit the separation of the grid from the same, said arches being located near the remaining sides of the plate and swingable outwardly to clear the plate and allow the grid to be removed from the same.

HAROLD C. BOETTCHER.

No references cited.